(12) United States Patent
Kadowaki et al.

(10) Patent No.: US 9,043,083 B2
(45) Date of Patent: May 26, 2015

(54) PARKING ASSISTANCE APPARATUS

(75) Inventors: Jun Kadowaki, Kariya (JP); Yu Tanaka, Nagoya (JP); Hiroyuki Tachibana, Kariya (JP); Atsuo Fukaya, Obu (JP); Motokatsu Tomozawa, Nagoya (JP); Kosuke Sato, Toyota (JP); Kenji Kodera, Chita-gun (JP)

(73) Assignee: AISIN SEIKI KABUSHIKI KAISHA, Aichi-ken (JP)

( * ) Notice: Subject to any disclaimer, the term of this patent is extended or adjusted under 35 U.S.C. 154(b) by 211 days.

(21) Appl. No.: 13/696,899

(22) PCT Filed: Jun. 8, 2011

(86) PCT No.: PCT/JP2011/063127
§ 371 (c)(1),
(2), (4) Date: Nov. 8, 2012

(87) PCT Pub. No.: WO2011/158713
PCT Pub. Date: Dec. 22, 2011

(65) Prior Publication Data
US 2013/0060421 A1    Mar. 7, 2013

(30) Foreign Application Priority Data
Jun. 18, 2010   (JP) .................... 2010-139258

(51) Int. Cl.
*G05D 1/00* (2006.01)
*B60Q 1/48* (2006.01)
(Continued)

(52) U.S. Cl.
CPC .......... *B62D 15/027* (2013.01); *B60R 2300/301* (2013.01); *B60R 2300/305* (2013.01); *B60R 2300/607* (2013.01); *B60R 2300/806* (2013.01); *B60R 1/00* (2013.01)

(58) Field of Classification Search
CPC .... B62D 15/028; G08G 1/14; B60T 2201/10; G01C 21/26; B60K 35/00; B60R 16/0231; G07B 15/02
USPC .............................. 701/36; 340/932.2; 705/13
See application file for complete search history.

(56) References Cited

U.S. PATENT DOCUMENTS 7,263,420 B2    8/2007    Tanaka et al.
7,640,107 B2   12/2009    Shimizu et al.
(Continued)

FOREIGN PATENT DOCUMENTS

| CN | 1959346 A | 5/2007 |
| CN | 101226238 A | 7/2008 |

(Continued)

OTHER PUBLICATIONS

Chinese Office Action, dated Jul. 30, 2014, issued in corresponding Chinese Patent Application No. 201180030031.6.
(Continued)

*Primary Examiner* — Mary Cheung
(74) *Attorney, Agent, or Firm* — Sughrue Mion, PLLC

(57) ABSTRACT

A parking assistance apparatus has a region detector capable of detecting a plurality of possible parking regions where a vehicle can park in at least one side to the left or right of the vehicle, a photographic image of the scenery surrounding the vehicle including the possible parking regions is displayed on a monitor device, the possible parking regions detected by the region detector are superimposed on the photographic image as graphic images showing parking target candidates in all of the corresponding positions, and one of the parking target candidates can be selected as a parking target on the basis of a command input from a driving device of the vehicle.

6 Claims, 10 Drawing Sheets

(51) Int. Cl.
　　*B62D 15/02*　　(2006.01)
　　*B60R 1/00*　　(2006.01)

(56) References Cited

U.S. PATENT DOCUMENTS

| | | | |
|---|---|---|---|
| 8,140,209 B2 | 3/2012 | Adachi et al. | |
| 8,232,893 B2 | 7/2012 | Endo et al. | |
| 8,275,518 B2 | 9/2012 | Watanabe et al. | |
| 2002/0123829 A1* | 9/2002 | Kuriya et al. | 701/1 |
| 2004/0204807 A1* | 10/2004 | Kimura et al. | 701/36 |
| 2004/0257244 A1* | 12/2004 | Kubota et al. | 340/932.2 |
| 2005/0043871 A1* | 2/2005 | Endo et al. | 701/36 |
| 2005/0049766 A1 | 3/2005 | Tanaka et al. | |
| 2005/0055139 A1* | 3/2005 | Tanaka et al. | 701/1 |
| 2005/0285758 A1* | 12/2005 | Matsukawa et al. | 340/932.2 |
| 2006/0287825 A1 | 12/2006 | Shimizu et al. | |
| 2007/0100543 A1 | 5/2007 | Kato et al. | |
| 2008/0100472 A1* | 5/2008 | Mizusawa et al. | 340/932.2 |
| 2009/0091475 A1 | 4/2009 | Watanabe et al. | |
| 2009/0118900 A1 | 5/2009 | Adachi et al. | |
| 2009/0174574 A1 | 7/2009 | Endo et al. | |
| 2010/0007525 A1* | 1/2010 | Shanbhag et al. | 340/932.2 |
| 2010/0049401 A1 | 2/2010 | Watanabe et al. | |
| 2010/0156671 A1* | 6/2010 | Lee et al. | 340/932.2 |
| 2011/0087406 A1* | 4/2011 | Barth et al. | 701/41 |

FOREIGN PATENT DOCUMENTS

| | | |
|---|---|---|
| CN | 101360632 A | 2/2009 |
| JP | 2001-6097 A | 1/2001 |
| JP | 2004-123059 A | 4/2004 |
| JP | 2005-67565 A | 3/2005 |
| JP | 2006-224778 A | 8/2006 |
| JP | 2007-253819 A | 10/2007 |
| JP | 2007-290557 A | 11/2007 |
| JP | 2007-302065 A | 11/2007 |
| JP | 2008-201363 A | 9/2008 |
| JP | 2009-205191 A | 9/2009 |
| WO | 2007/058325 A1 | 5/2007 |

OTHER PUBLICATIONS

International Preliminary Report on Patentability for International Application No. PCT/JP2011/063127, dated Jan. 24, 2013.
International Search Report for PCT/JP2011/063127 dated Sep. 13, 2011.
Chinese Office Action, dated Apr. 3, 2015 issued in corresponding Chinese Patent Application No. 201180030031.6.

* cited by examiner

PARKING ASSISTANCE APPARATUS

CROSS REFERENCE TO RELATED APPLICATIONS

This application is a National Stage of International Application No. PCT/JP2011/063127 filed Jun. 8, 2011, claiming priority based on Japanese Patent Application No. 2010-139258 filed Jun. 18, 2010, the contents of all of which are incorporated herein by reference in their entirety.

TECHNICAL FIELD

The present invention relates to a parking assistance apparatus for assisting driving operation when a vehicle is parking.

BACKGROUND ART

Examples of systems that have been put into practical application as parking assistance apparatus for assisting driving operation during parking include a system for automatically steering and guiding a vehicle to a set parking target position, a system for indicating steering direction and steering amount to the driver, and other systems. Conventionally, when setting the parking target position, the driver has needed to operate input means provided inside the vehicle, such as a monitor device with setting switches and a touch panel. In response to this, parking assistance apparatus has been proposed in which a parking target position can be set without input means that are not used in normal driving operations. Japanese Laid-open Patent Application No. 2008-201363 (Patent Document 1) discloses a parking assistance apparatus for setting a parking mode and a parking target position on the basis of the driver's operation of the steering wheel. Thereby, when the steering wheel is operated a predetermined amount or more to either the left or right, a parking target position corresponding to parking in a garage to the left or right is set. When the steering wheel is not operated a predetermined amount or more to either the left or right, a parking target is set which corresponds to parallel parking to the left (Patent Document 1: FIGS. 5 and 9, paragraphs 27 to 36, etc.).

The set parking target position is set automatically by the parking assistance apparatus in relation to position of the vehicle (FIG. 7 of the Patent Document 1, for example). Therefore, the driver does not have much freedom in selecting the parking target position relative to the vehicle. Even when a plurality of parking spots are open in a parking lot of a shopping center or the like, for example, and the driver intends to park in a spot near the entrance/exit, there are cases in which the spot that is set is different from the driver's desired spot in terms of the positional relationship to the vehicle. In other words, even though the parking assistance apparatus of Patent Document 1 allows for the selection of a plurality of parking target positions, the parking modes and the parking target positions have a one-to-one correspondence. Specifically, even through the parking mode can be selected, the parking target position is defined unambiguously in any parking mode, and it is not possible to select any desired parking target position.

Setting the parking target position is not limited to setting in relation to the position of the vehicle as in Patent Document 1. As disclosed in Japanese Laid-open Patent Application No. 2007-290557 (Patent Document 2), for example, there are also methods for using sonar or the like to detect open space while the vehicle is traveling, methods for recognizing images of white lines indicating parking spots, and other methods (Patent Document 2: FIGS. 2 and 5, paragraphs 27 and 45, and the like). However, in either of these methods, the driver is unable to set any desired parking target position in a simple manner without using input means that are not used during normal driving operation. In Patent Document 2, a first target parking position and a second target position can be selected, and it is possible to select among open spaces detected using sonar or the like while the vehicle is traveling as well as parking spots where images of white lines are recognized. However, the parking assistance apparatus automatically makes this selection on the basis of the likelihood of the detection result, and this is not a system that allows the driver to set any desired parking target position.

PRIOR ART DOCUMENTS

Patent Documents

Patent Document 1: Japanese Laid-open Patent Application No. 2008-201363
Patent Document 2: Japanese Laid-open Patent Application No. 2007-290557

SUMMARY OF THE INVENTION

Problem to be Solved by Invention

In view of the background described above, there is demand that a driver be able to set a parking target position in a simple manner with a high degree of freedom without using input means not used in normal driving operation.

Means for Solving the Problem

An aspect of a parking assistance apparatus according to the present invention aimed at the object described above comprises a region detector capable of detecting a plurality of possible parking regions in which a vehicle can park in at least one side to the left or right of the vehicle, photographic image acquisition part for acquiring a photographic image of the scene surrounding the vehicle, a display controller for displaying the photographic image on a monitor device and superimposing graphic images showing parking target candidates in positions where the possible parking regions detected by the region detector correspond on the photographic image, and a selection part capable of selecting one of the parking target candidates as a parking target on the basis of command input from a driving device of the vehicle.

According to the above aspect, the driver can select a desired parking position without disrupting the orientation during normal driving operation. A parking position can be selected by an operation conforming with normal driving operation without operating the touch panel or another device again, for example.

It is preferable that the selection part of the parking assistance apparatus according to the present invention be capable of selecting one of a plurality of the parking target candidates as the parking target in at least one side to the left or right of the vehicle. The driver can select the desired parking position when a plurality of parking positions are open in the direction where the driver intends to stop in one side to the left or right of the vehicle. This is effective in cases in which the driver intends to park in a position near the entrance in a shopping center or the like, for example.

It is preferable that the driving device is a steering device of the vehicle. When the vehicle is driven, there is no useless action in selecting the desired parking position and operation is extremely simple because the driver is holding the steering device. When parking, the vehicle must be steered in order to turn, but at least part of the steering at this time can be also executed when the parking target position is selected. In other words, the time needed to park after the parking target position is selected can be shortened because when the parking target position is selected, the vehicle proceeds somewhat in the initial steering angle in effect at the vehicle's initial movement.

It is preferable that the selection part of the parking assistance apparatus according to the present invention selects, as the parking target, the parking target candidate located in the steering direction of the steering device. Particularly, it is preferable that the selection part, when the region detector has detected the possible parking regions to both the left and right of the vehicle, selects as the parking target the parking target candidate in the direction corresponding to the steering direction of the steering device from among the parking target candidates corresponding to the detected possible parking regions. As described above, when parking, the vehicle must be steered in order to turn the vehicle, but a parking target position can be selected based on the steering direction in effect at the time. The time needed to park after the parking target position has been selected is shortened because the steering at the time of the parking target position being selected can be allotted somewhat to the initial steering angle in effect when the vehicle begins to move.

Even when no possible parking regions are detected to either the left or right of the vehicle; i.e., even when a possible parking region is detected in either only the left or only the right, a parking target candidate located in the steering direction of the steering device may be selected. Specifically, the selection part of the parking assistance apparatus according to the present invention may select the parking target candidate located in the steering direction of the steering device as the parking target regardless of whether or not possible parking regions are detected to both the left and right of the vehicle. In this case, no parking target candidate is selected when the vehicle is steered in the direction in which no possible parking regions are detected, and any parking target candidate is selected when the vehicle is steered in the direction in which a possible parking region is detected. A parking target can thereby be selected by steering in the same direction as the steering direction for turning the vehicle, even in cases in which a possible parking region is detected either only to the left or only to the right.

It is preferable that the selection part of the parking assistance apparatus according to the present invention selects as the parking target the parking target candidate in a position that is nearer to the vehicle when, based on the operated amount of the steering device, the operated amount is greater. The vehicle turns by a greater amount when the steered amount of the steering device is large. Therefore, it is preferable to park in a position nearer to the vehicle. Consequently, it is preferable that the greater the operated amount, the nearer to the vehicle is the position of the parking target candidate selected as the parking target. Particularly, the operation for parking (steering) and the operation for selecting the parking target (steering) are satisfactorily adapted by combining the selection by the operated amount (the steered amount) and the selection by the steering direction described above. Consequently, by an operation conformable to normal driving operation, the driver can select a desired parking target from parking target candidates corresponding to possible parking regions detected in a wide range. Specifically, the driver can set the parking target position in a simple manner with a high degree of freedom, the input means being the driving device used in normal driving operation.

When the parking target is decided, the parking assistance apparatus calculates a parking route to the parking target, and guidance along this parking route is given. The steering angle of the steered wheels, i.e. the operated amount of the steering device is needed as an initial condition in this parking route calculation. When a configuration is used in which the operated amount of the steering device when the parking target is selected is treated as an initial steering angle during the guidance along the parking route to the parking target, guidance can be started immediately when the parking target is selected, which is advantageous.

In one common parking process in a parking lot, a driver traverses a parking lot guideway while searching for an open parking spot, confirms a found parking spot in a rearview mirror, and begins to park in reverse. When the present invention is applied to such a parking process, the configuration is preferably such that a photographic image displayed in the monitor device is a photographed image of the rear of the vehicle reflected left-to-right as in a mirror, and one of the parking target candidates superimposed on the photographic image is selected as the parking target. Such a configuration is advantageous during reverse parking because the steering in effect at the time the parking target candidate located in the steering direction in the monitor device is selected as the parking target can be allotted somewhat in the initial steering angle in effect when the vehicle begins to move.

MODES OF EMBODYING THE INVENTION

Embodiments of the parking assistance apparatus according to the present invention are described hereinbelow based on the drawings.

Figure 1:
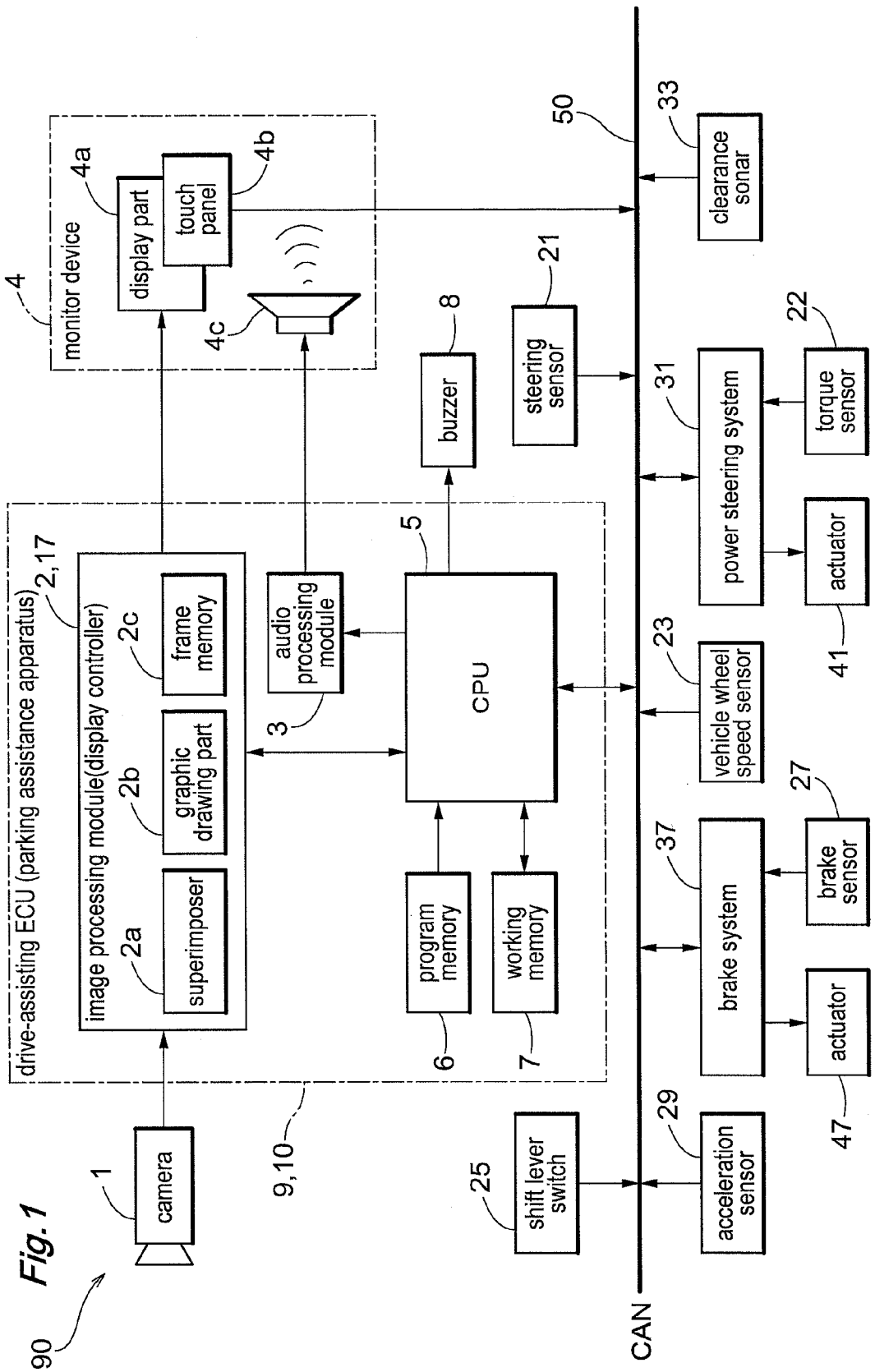
FIG. 1 is a block diagram schematically showing an example of a system configuration of a vehicle.

A parking assistance apparatus 10 is provided with a central processing unit (CPU) 5 for performing image recognition, route estimation, and other advanced calculation processes, and for handling the core of the parking assistance apparatus 10, as shown in FIG. 1. The CPU 5 uses programs and parameters stored in a program memory 6 to execute various calculation processes. The CPU 5 also primarily stores photographic images and the like in a working memory 7 as necessary to execute calculations. The program memory 6 and the working memory 7 are separate memories from the CPU 5 in the example shown here, but they may be integrated in the same package as the CPU 5. The parking assistance apparatus 10, together with the CPU 5, memory, and other surrounding circuitry, is configured as a drive-assisting electronic control unit (ECU) 9. The functioning parts of the parking assistance apparatus 10 are implemented by cooperation of hardware and software. In the present example, the CPU 5 is the core, but the parking assistance apparatus 10 may be configured with a digital signal processor (DSP) or another logic calculation processor or logic circuit as the core.

The image photographed by a camera 1 (an onboard camera) is displayed on a monitor device 4 via an image processing module 2 having a superimposer 2a, a graphic drawing part 2b, and a frame memory 2c, as shown in FIG. 1. The image processing module 2 functions as a photographic image acquisition part 15 and a display controller 17 of the present invention, similar to the CPU 5, the program memory 6, and the like (see FIG. 2). The camera 1 is a digital camera which uses a charge coupled device (CCD), a CMOS image sensor (CIS), and other photographing elements to photograph two-dimensional images of 15 to 30 frames per second in chronological order; digitally converts the photographs; and outputs video data (photographic images). The two-dimensional image of each frame can be stored in the frame memory 2c, and subjected to image processing or graphic superimposition with each frame. The CPU 5 issues drawing commands to the graphic drawing part 2b and graphic superimposition commands to the superimposer 2a.

The monitor device of a navigation system could also be used as the monitor device 4, for example. The monitor device 4 has a display part 4a, a touch panel 4b formed on the display part 4a, and a speaker 4c, as shown in FIG. 1. The display part 4a displays photographic images of the camera 1, graphic images, images combining the two, and the like provided from the image processing module 2. As an example, the display part 4a is configured by a liquid crystal display. The touch panel 4b, which is formed together with the display part 4a, is a pressure-sensitive or electrostatic command input device that can output positions touched by fingers or the like as location data. FIG. 1 shows an example in which the speaker 4c is provided to the monitor device 4, but the speaker 4c may be provided to another location such as the inner side of a door. The speaker 4c outputs audio provided from an audio processing module 3 in accordance with the commands of the CPU 5. In some cases, the CPU 5 simply emits a notification sound via a buzzer 8.

The CPU 5 is connected in a communicable manner with various systems and sensors via an onboard network shown by the symbol 50 in FIG. 1. In the present embodiment, a controller area network (CAN) 50 is shown as an example of the onboard network. The parking assistance apparatus 10 (the CPU 5) is connected with an onboard power steering system 31 and brake system 37 as shown in FIG. 1. These systems are configured with a CPU or another electronic circuit as the core, similar to the parking assistance apparatus 10, and with an ECU configured together with surrounding circuitry as the core, similar to the drive-assisting ECU 9.

The power steering system 31 is an electric power steering (EPS) system or a steer-by-wire (SBW) system. This system provides assist torque by an actuator 41 to the steering wheel operated by the driver, and also performs automatic steering by driving the steering wheel or the steered wheels by the actuator 41. The brake system 37 is an anti lock braking system (ABS) for suppressing brake locking, a lateral sliding prevention device (electronic stability control (ESC)) for suppressing lateral sliding of the vehicle when cornering, an electric brake system having brake assist or the like for increasing brake force, or a brake-by-wire (BBW) system. This system can impart braking force to the vehicle 90 via the actuator 47.

In FIG. 1, as an example of the various sensors, a steering sensor 21, a vehicle wheel speed sensor 23, a shift lever switch 25, and an acceleration sensor 29 are connected to the CAN 50. The steering sensor 21 is a sensor for detecting the steered amount (rotational angle) of the steering wheel, and is configured using Hall elements or the like, for example. The parking assistance apparatus 10 acquires the steered amount of the steering wheel by the driver or the steered amount during automatic steering from the steering sensor 21 to execute various controls.

The vehicle wheel speed sensor 23 is a sensor for detecting the rotational amount or the rotational speed per unit time of the wheels of the vehicle 90, and is configured using Hall elements or the like, for example. Based on information acquired from the vehicle wheel speed sensor 23, the parking assistance apparatus 10 calculates data such as the movement amount of the vehicle 90 and executes various controls. There are also cases in which the vehicle wheel speed sensor 23 is provided to the brake system 37. The brake system 37 detects indications of brake locking, wheel idling, and lateral sliding from the difference in rotation between the left and right wheels, and executes various controls. When the vehicle wheel speed sensor 23 is provided to the brake system 37, the parking assistance apparatus 10 acquires information via the brake system 37. A brake sensor 27 is a sensor for detecting the operated amount of a brake pedal, and the parking assistance apparatus 10 acquires information via the brake system 37. In cases such as when the brake pedal is depressed during automatic steering, the parking assistance apparatus 10 can assert that the environment is not conducive to automatic steering and perform control for interrupting or ceasing automatic steering.

The shift lever switch 25 is a sensor or switch for detecting the position of the shift lever, and is configured using a displacement sensor or the like. The parking assistance apparatus 10 can start assistance control when the gearshift has been placed in reverse, and can end assistance control when the gearshift has been changed from reverse to forward, for example.

A torque sensor 22 for detecting operational torque imparted to the steering wheel is also capable of detecting whether or not the driver is gripping the steering wheel. The parking assistance apparatus 10 can assert that the environment is not conducive to automatic steering and perform control for interrupting or ceasing automatic steering in cases such as when the driver has a firm grip in order to operate the steering wheel during automatic steering. During automatic steering, creeping of the vehicle 90 from engine idling is commonly utilized. Consequently, when the acceleration sensor 29 has detected that the driver has operated the acceleration pedal, the parking assistance apparatus 10 can assert that the environment is not conducive to automatic steering and perform control for interrupting or ceasing automatic steering.

The various systems and sensors shown in FIG. 1 and their forms of connection are merely one example, and other configurations and forms of connection may be used. As described above, sensors may be connected directly to the CAN 50, or they may be connected via various systems.

As described above, the parking assistance apparatus 10 is configured with the CPU 5 as a core, and the device cooperates with programs (software) stored in the program memory 6 to carry out various calculations for parking assistance. Types of parking assistance include:

(1) projecting an image of the rear of the vehicle on the monitor installed inside the vehicle, and superimposing vehicle-width extension lines, imaginary route lines, and other guidelines;

(2) setting a parking target, providing audio instruction or the like to guide the driver's operation; and (3) imposing only speed adjustment on the driver and guiding the vehicle to the parking target by automatic steering. A parking target is set in (2) and (3), but there are various methods of detecting the parking target. Examples of methods include:

(a) using sonar (clearance sonar 33) or the like to detect and automatically recognize open regions and detect a parking target when the vehicle has passed a parking target position;

(b) performing image recognition of dividing lines, for example, to detect a parking target; and (c) combining a plurality of methods such as (a) and (b) in order to improve precision.

The present embodiment describes an example of a parking assistance apparatus which imposes only speed adjustment on the driver and guides the vehicle to the parking target by automatic parking, as in (3) above. The present embodiment also describes an example of a configuration which combines open region detection by sonar or the like and image recognition of dividing lines to detect a parking target, as in (c) above. However, as shall be apparent, it is also possible to apply the present invention to a parking assistance apparatus in which the driver steers manually. The present invention can also be applied to cases in which the parking target position is detected by a method of using sonar and photographic images separately or another method. Consequently, the embodiments described hereinbelow constitute one example and do not limit the present invention.

Figure 2:
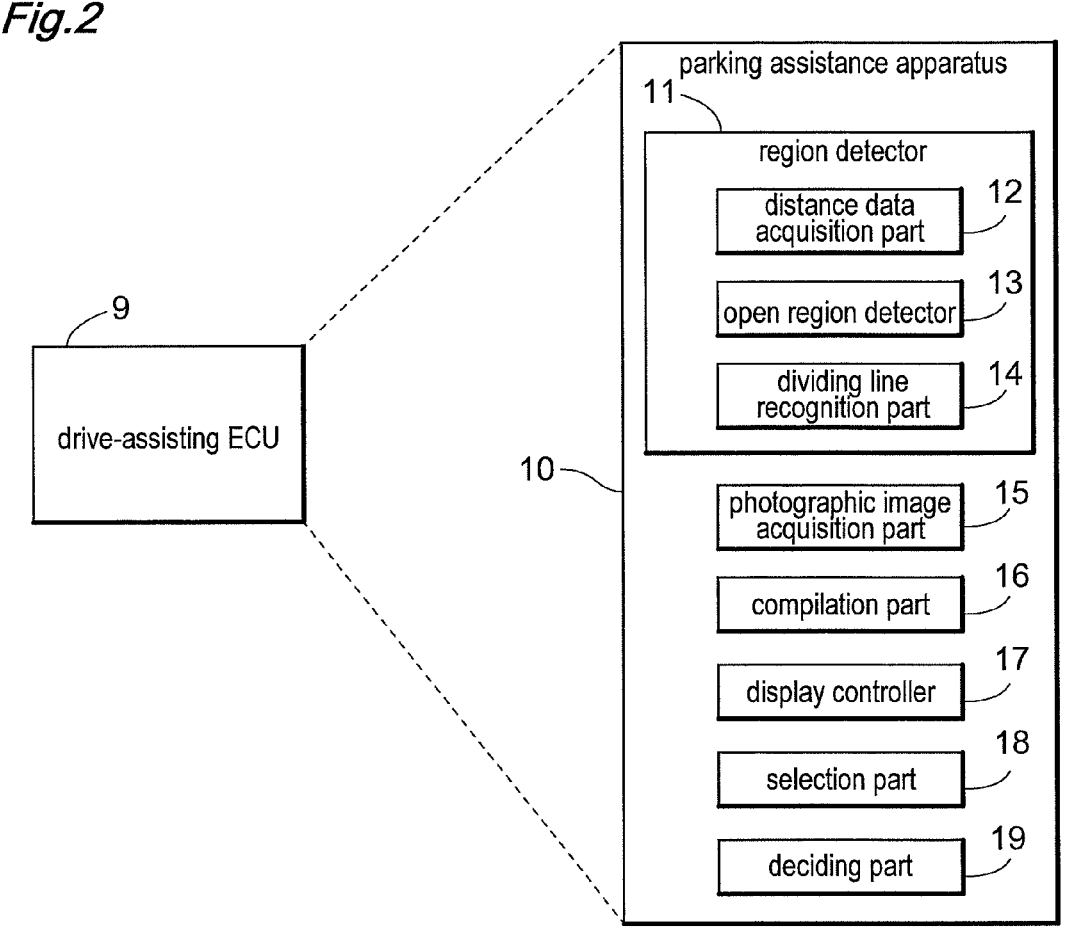
FIG. 2 is a block diagram schematically showing an example of a function configuration of a parking assistance apparatus.

As described above, the parking assistance apparatus 10 is configured as an ECU 9 with a CPU 5 as the core, and the functions thereof are achieved by the cooperation of hardware and software. FIG. 2 uses a block diagram to schematically show an example of the function configuration of the parking assistance apparatus 10. The functions of these functioning parts are also achieved by the cooperation of hardware and software, and the functioning parts need not be provided separately in the ECU 9. The parking assistance apparatus 10 is configured having a region detector 11, a photographic image acquisition part 15, a compilation part 16, a display controller 17, a selection part 18, and a deciding part 19, as shown in FIG. 2. The region detector 11 is configured having a distance data acquisition part 12, an open region detector 13, and a dividing line recognition part 14.

The functioning parts are described hereinbelow. The region detector 11 is a functioning part capable of detecting a plurality of possible parking regions (the symbol G used hereinafter) in which the vehicle 90 can be parked. The term "capable of detecting a plurality of regions" means that possible parking regions G in a plurality of locations can be detected in at least one side to the left and right of the vehicle 90. For example, two possible parking regions G could be detected to the left direction of the vehicle 90, two possible parking regions G could be detected to the right direction of the vehicle 90, or a total of three possible parking regions G could be detected, two to the left direction of the vehicle 90 and one to the right direction of the vehicle 90. As shall be apparent, it is also possible for two or more possible parking regions G to be detected to both the left and right, for a total of four or more.

Figure 3:
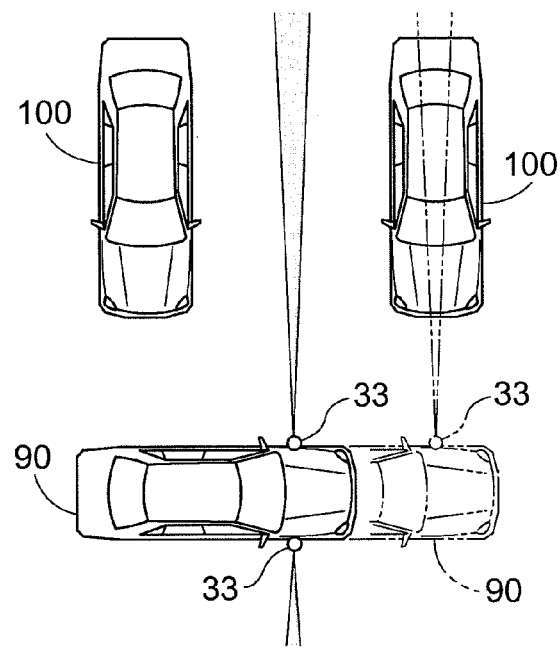
FIG. 3 is a diagram showing an example of detecting an open region.
Figure 4:
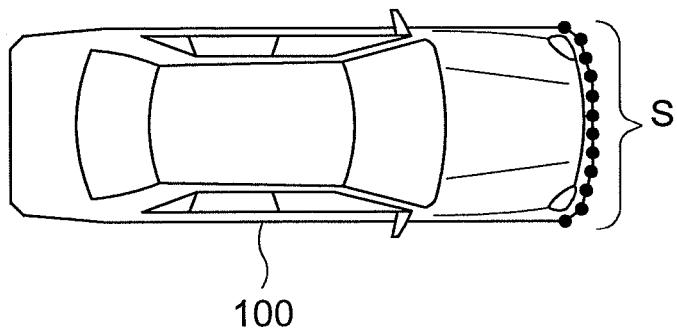
FIG. 4 is a diagram showing an example of surface shape information.

As described above, the region detector 11 has the distance data acquisition part 12 and the open region detector 13. The distance data acquisition part 12 is a functioning part for acquiring the detection results of the clearance sonar 33 or another distance sensor, and the open region detector 13 is a functioning part for detecting open regions on the basis of the detection results of the distance sensor. Described hereinbelow is an example of a case in which open regions for parking are detected by recognizing other vehicles. Clearance sonars 33 (distance sensors) as point sensors facing to the sides are installed on the vehicle 90, as shown in FIG. 3. Single beam sensors, laser radar, and other distance sensors may also be installed. When the vehicle 90 passes by the sides of other vehicles 100 that have been parked (hereinbelow referred to as the parked vehicles), the distances to the parked vehicles 100 are gauged by the clearance sonars 33. For example, the clearance sonars 33 gauge the distances with the parked vehicles 100 in accordance with the movement of the vehicle 90 and acquire surface shape information S such as is shown in FIG. 4.

The surface shape information S of a parked vehicle 100 is discrete data according to the movement distance of the vehicle 90. The movement speed of the vehicle 90, the movement distance, and the movement time are established linearly. For example, if these parameters are gauged according to predetermined time intervals when the vehicle 90 moves at a constant speed, the parameters are measured according to the movement distance. The movement speed and movement distance of the vehicle 90 can be acquired by the ECU 9 on the basis of the detection results of the vehicle wheel speed sensor 23. Any method may be used as long as the method is capable of obtaining mostly uniform surface shape information S as a result.

The open region detector 13 calculates the goodness of fit between the surface shape information S and bumper shapes of common vehicles stored in the program memory 6 or the like. When the surface shape information S is determined according to a predetermined standard to be equivalent to a vehicle bumper shape, the region containing the surface shape information S is detected as an "occupied region (space)." Conversely, a region not equivalent to an "occupied region" is detected as an "open region (space)."

Figure 5:
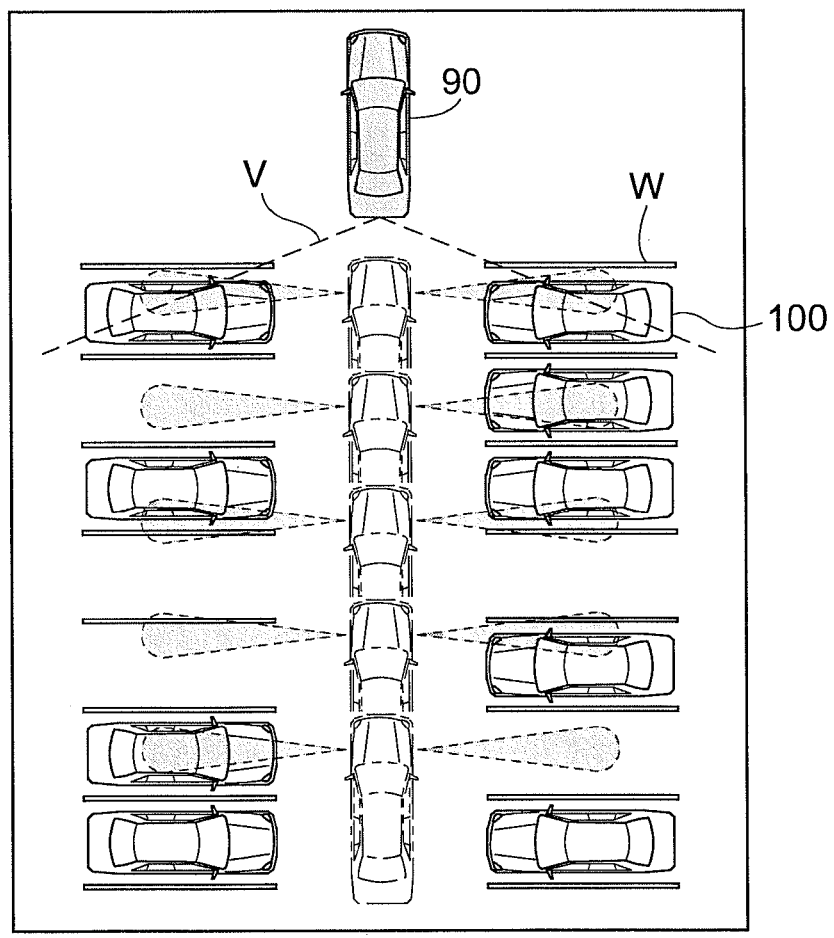
FIG. 5 is a diagram showing an example of detecting open regions in a parking lot.
Figure 6:
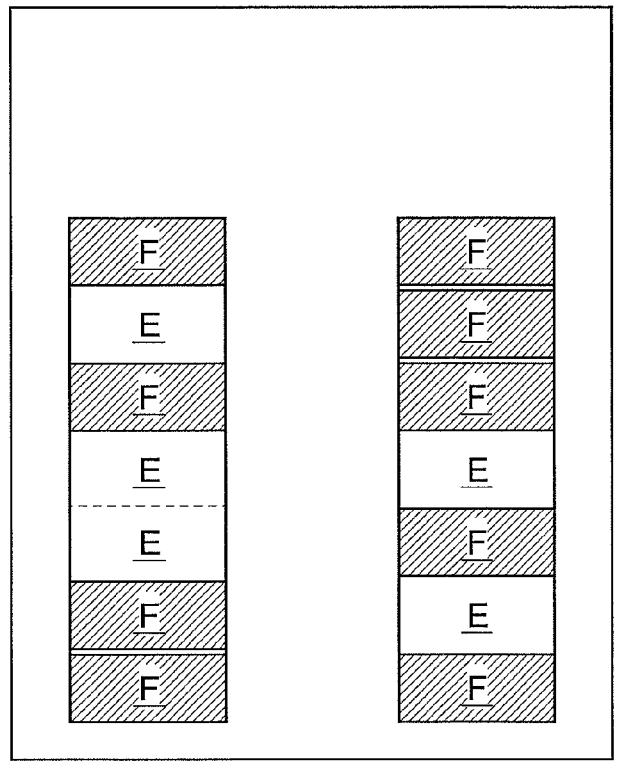
FIG. 6 is a diagram showing an example of the results of detecting open regions.

FIG. 5 uses a bird's-eye view to show an example in which "open regions" are detected while the vehicle 90 traverses a route in the parking lot of a shopping center or the like, for example. Spaces devoid of parked vehicles 100, e.g., spaces between two parked vehicles 100 parked in adjacent parking spots are theoretically detected as open regions. However, a predetermined length along the progressing direction of the vehicle 90 in FIG. 5 is designated as a threshold value, and when there a region that is not an occupied region is detected along in a length equal to or greater than the threshold value, this region is detected as an open region E. When adjacent parking spots are consecutively detected as not being occupied regions, theoretically they are detected as a single open region E. After a wide open region E such as this is detected, the open region E may be divided, an imaginary boundary may be provided, and the region may be set as a plurality of open regions E. FIG. 6 schematically shows an example of "open regions E" and "occupied regions F" detected in this manner. Since the open regions E are detected as the vehicle 90 is moving, open regions E located within a predetermined range from the vehicle 90 are all compiled in the compilation part 16 whose core is the working memory 7 another component.

Figure 7:
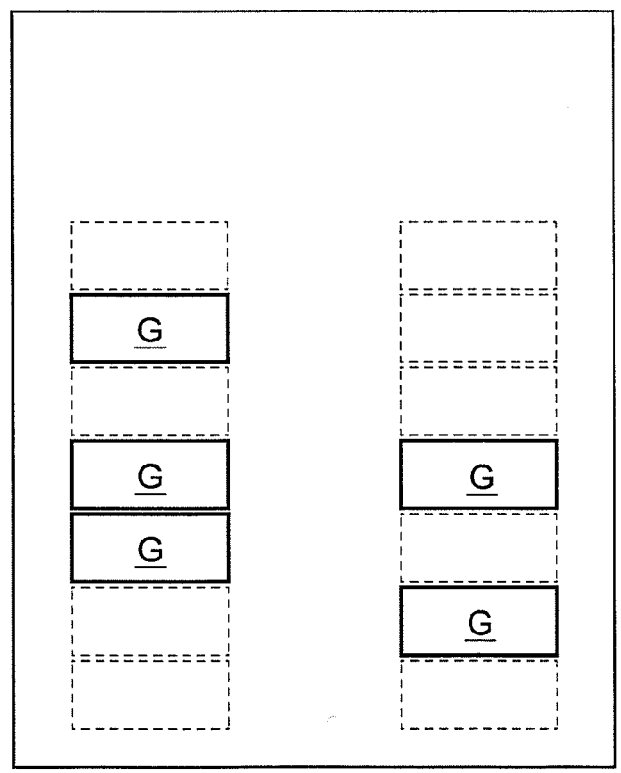
FIG. 7 is a diagram showing an example of the results of detecting possible parking regions.

The distance data acquisition part 12 and the open region detector 13 can be used to detect a plurality of open regions E, and these regions can be set as possible parking regions G. However, in the present embodiment, the region detector 11 is also configured using the dividing line recognition part 14, and dividing lines W in the open regions E are identified by image recognition, whereby possible parking regions G are detected as shown in FIG. 7. Image recognition of the dividing lines W is described hereinafter. As described above based on FIGS. 3 through 7, the region detector 11 is capable of detecting a plurality of possible parking regions G where the vehicle 90 can park in at least one side to the left and right of the vehicle 90. This ability to detect is because parking spots cannot be detected if they are not open, and the region detector 11 is a functioning part for detecting a plurality of possible parking regions G where the vehicle 90 can park. FIG. 7 shows an example in which three possible parking regions G have been detected to the left direction of the vehicle 90 and two have been detected to the right direction, for a total of five.

Figure 8:
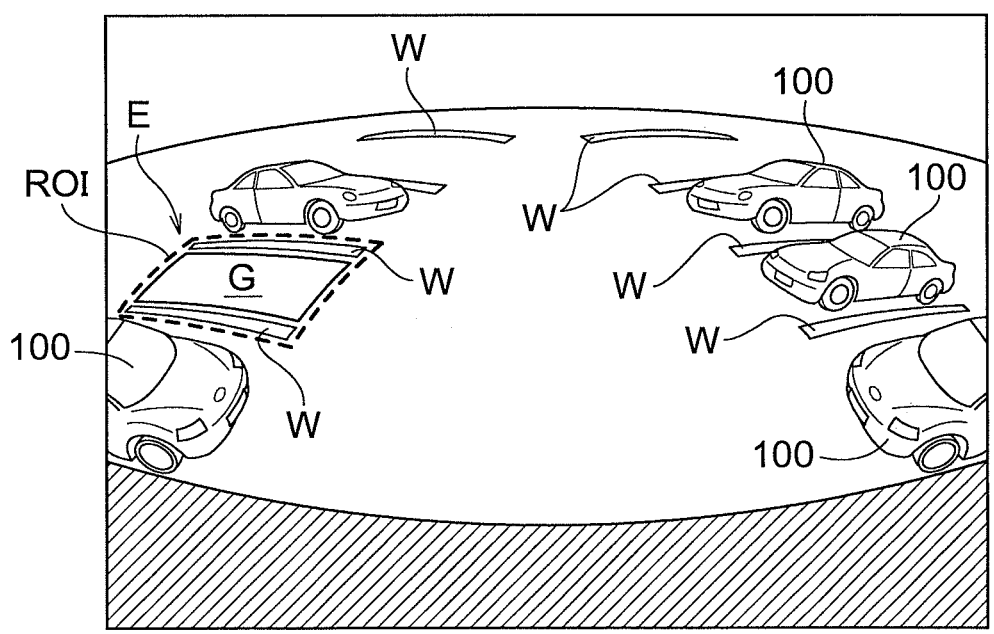
FIG. 8 is a drawing for describing the principle of image recognition of dividing lines, using a display image.

The photographic image photographed by the camera 1 is displayed on the monitor device 4 via the image processing module 2, as described above. FIG. 8 shows an example in which the photographic image taken by the camera 1 of the vehicle 90 in the position shown in FIG. 5 is displayed on the monitor device 4. The symbol V in FIG. 5 shows the photographed range of the camera 1 installed in the vehicle 90. The monitor device 4 is disposed in front of the position where the driver is seated, and the image displayed on the display part 4a of the monitor device 4 is therefore a left-right mirror reflection of the photographic image as shown in FIG. 8. In other words, the display achieves the same visual effect as though the driver were looking at the scenery behind the vehicle 90 via a rearview mirror. The photographic image is also utilized in the image recognition of dividing lines W by the dividing line recognition part 14. As shall be apparent, there is no need to use a mirror image in the image recognition of the dividing lines W, but for the sake of easier comprehension, image recognition of the dividing lines W is described using the same mirror image as the display of the monitor device 4.

The dividing line recognition part 14 performs image recognition of the dividing lines W on the photographic image the photographic image acquisition part 15 has acquired from the camera 1. As a pre-process preceding the image recognition of the dividing lines W, the dividing line recognition part 14 sets a region of interest ROI, which is a region that is the object of the image processing. The region of interest ROI is set to an image region equivalent to the open region E detected by the open region detector 13. The open region E and the region of interest ROI are concepts of the image processing, and do not need to be displayed on the monitor device 4 in practice. This is depicted in FIG. 8 in order to describe the image recognition procedure. The dividing line recognition part 14 performs image processing on the region of interest ROI and detects dividing lines W to detect (perform image recognition on) a possible parking region G. The calculation load is reduced because a region which is very small in comparison to the entire photographic image is set as the region of interest ROI and image recognition of the dividing lines W is executed within the region of interest ROI.

FIG. 8 shows an example in which a region of interest ROI is set in one open region E, but region of interests ROI are similarly set for other open regions E, and possible parking regions G are detected by detecting dividing lines W. As described above, open regions E are detected while the vehicle 90 is moving and the photographed range V of the vehicle 90 also changes as the vehicle 90 moves. Consequently, it is preferable that dividing line W recognition be carried out and possible parking regions G be detected sequentially in open regions E detected along with the movement of the vehicle 90. Possible parking regions G located within a predetermined range from the vehicle 90 are all compiled in the compilation part 16 whose core is the working memory 7 or another component.

Figure 9:
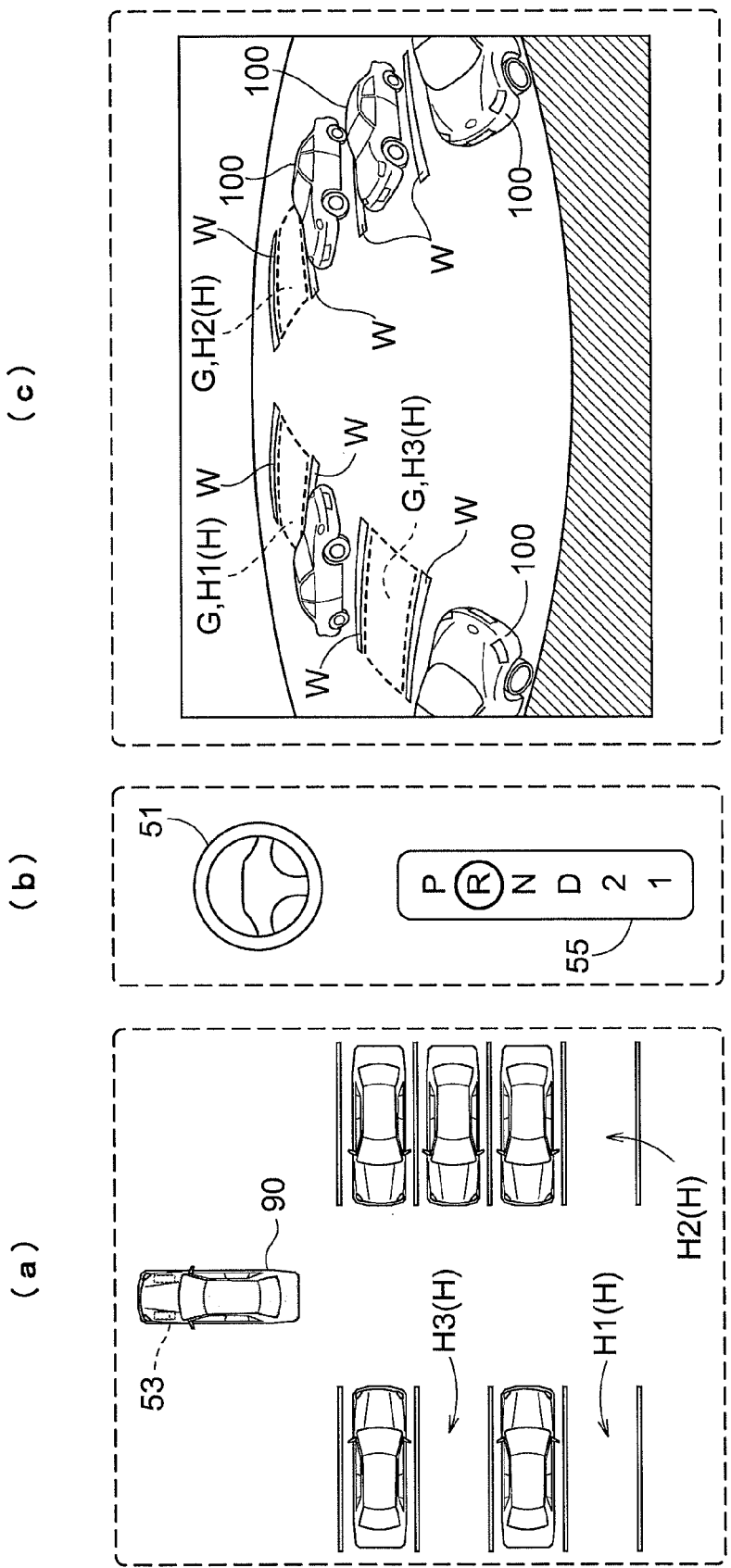
FIG. 9 is a drawing showing a display example of parking target candidates.

The display controller 17 is a functioning part which displays the photographic image on the monitor device 4 and superimposes a graphic image showing a parking target candidate H in a position where the possible parking region G detected by the region detector 11 corresponds on the photographic image. FIG. 9 shows an example in which possible parking regions G detected in a plurality of locations are displayed as parking target candidates H on the monitor device 4. As shown in FIG. 9(*c*), the possible parking regions G detected in a plurality of locations are displayed on the monitor device 4 by graphic images such as those shown by the dashed lines in the drawing, and the possible parking regions G are superimposed as parking target candidates H on the photographic image. The parking target candidates H are superimposed on the photographic image has yellow graphic images, for example. In FIG. 9, three parking target candidates H1, H2, and H3 are shown.

The selection part 18 is a functioning part that can select one of the parking target candidates H as a parking target (shown by the symbol T in FIGS. 10 through 12) on the basis of a command input from a driving device of the vehicle 90. The driver can select one of the plurality of parking target candidates H by operating a steering wheel 51 (steering device) which is one driving device. FIG. 9(*a*) is a bird's-eye view showing part of a parking lot, corresponding to FIG. 5. Parking target candidates H1 to H3 are open spots where parked vehicles 100 are not parked, as shown in FIG. 9(*a*). FIG. 9(*b*) schematically shows the steering wheel 51 and a shift lever 55. FIG. 9(*b*) shows a state in which the vehicle 90 has moved forward along the route of the parking lot and stopped as shown in FIG. 5 and the shift lever 55 has been placed in reverse, and the steering wheel 51 is in the neutral position. Consequently, as shown in FIG. 9(*c*), none of the plurality of selected possible parking regions G (parking target candidates H) have been selected, and all of the parking target candidates H are shown as unselected yellow graphic images.

The display controller 17 displays a plurality of parking target candidates H as graphic images, and the selection part 18 selects one of the parking target candidates H as a parking target T. Of course, when no possible parking regions G are detected by the region detector 11, the parking target candidates H are not displayed as graphic images and the selection part 18 does not select a parking target T from the parking target candidates H. When only one possible parking region G is detected by the region detector 11, the display controller 17 may display one parking target candidate H as a graphic image and may display the candidate as a parking target T from the beginning. When the display controller 17 has displayed one parking target candidate H as a graphic image, the selection part 18 can either select the parking target candidate H or leave a candidate unselected. When one possible parking region G has been detected and the display controller 17 displays this region as the parking target T from the beginning, the function of the selection part 18 remains dormant.

Figure 10:
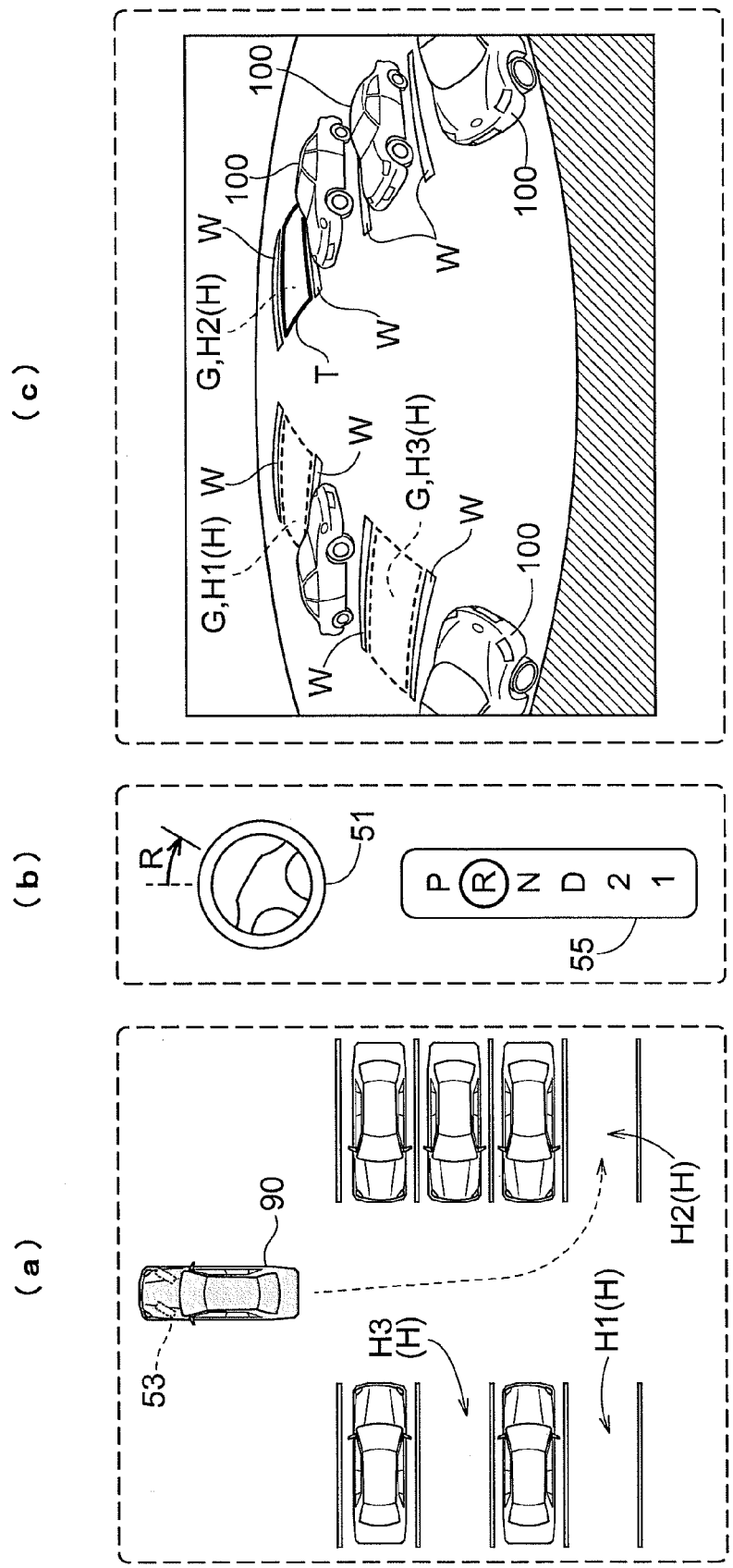
FIG. 10 is a drawing showing example 1 of selecting one of the parking target candidates of FIG. 9.
Figure 11:
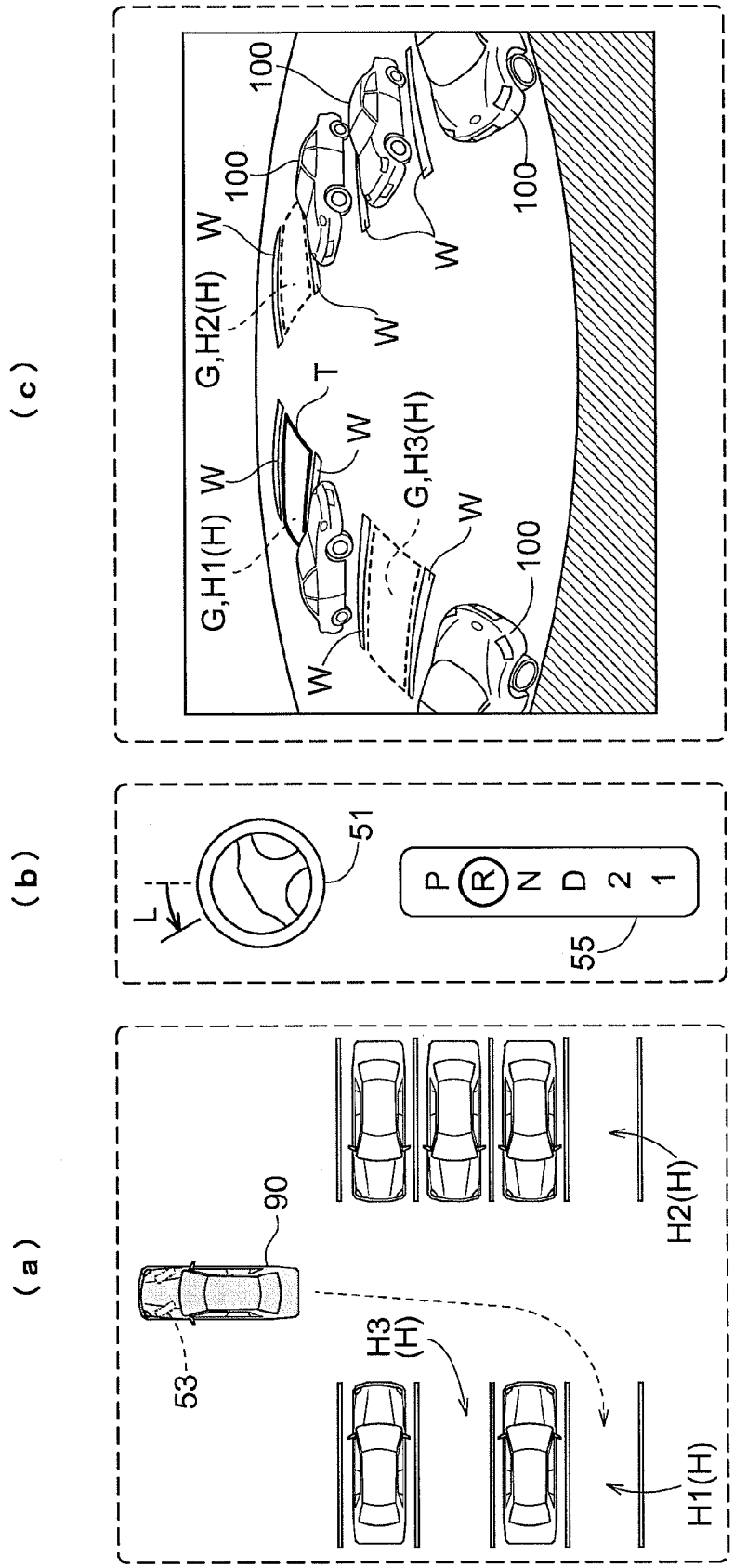
FIG. 11 is a drawing showing example 2 of selecting one of the parking target candidates of FIG. 9.
Figure 12:
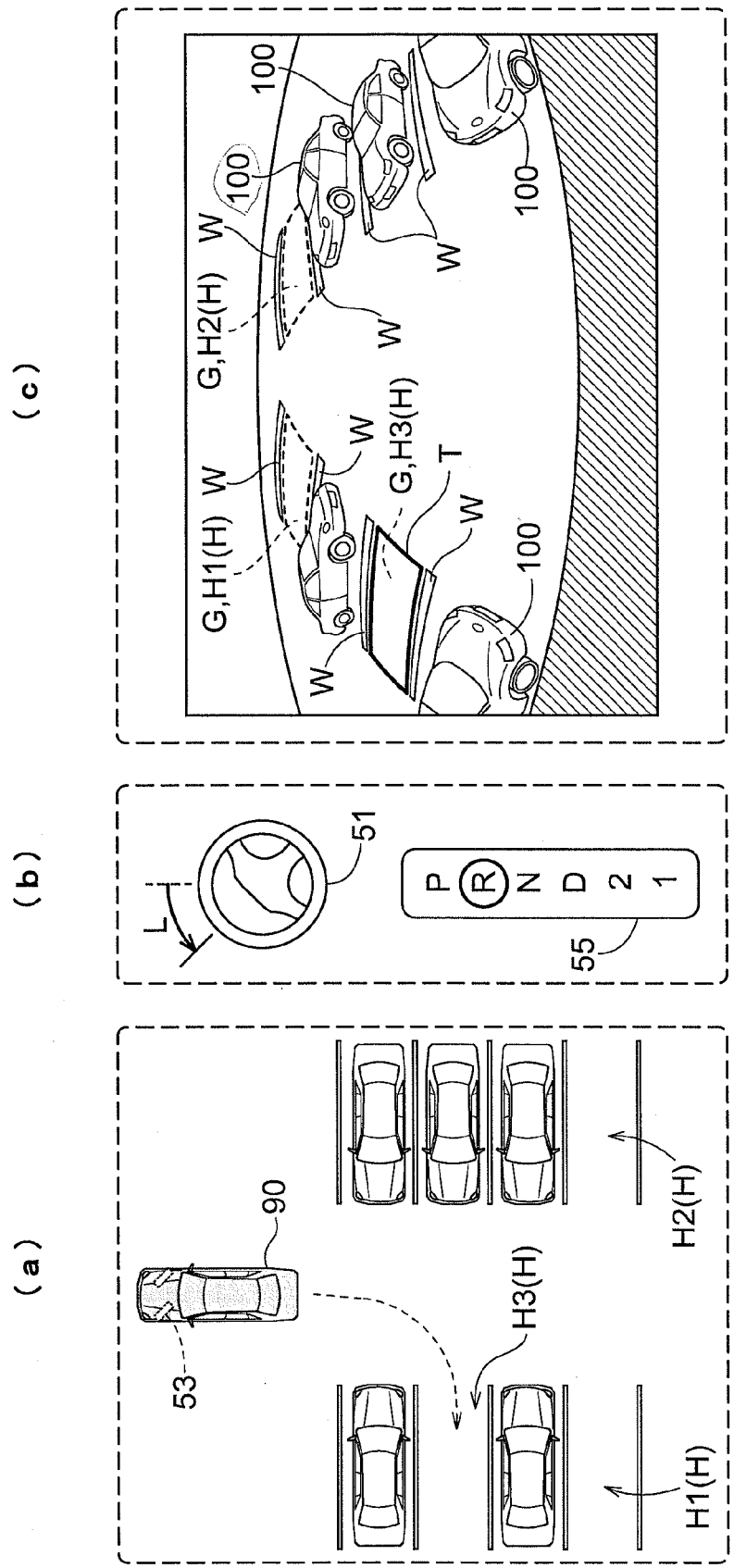
FIG. 12 is a drawing showing example 3 of selecting one of the parking target candidates of FIG. 9.

Below, FIGS. 10 through 12 are used to describe an example in which one of the parking target candidates H1 to H3 shown in FIG. 9 is selected. FIG. 10 shows an example of a case in which the steering wheel 51 is operated to the right direction (in the direction of the arrow R). A parking target candidate H detected to the right direction of the vehicle 90 can be selected by operating the steering wheel 51 to the right direction. In FIGS. 9 and 10, only one parking target candidate H2 is detected to the right direction of the vehicle 90, and the parking target candidate H2 is therefore selected by operating the steering wheel 51 to the right direction by a predetermined amount or more. The selected parking target candidate H2 is the parking target T and is displayed superimposed as a graphic image in a different form than the other parking target candidates H1 and H3 as shown by the solid lines in FIG. 10. For example, the selected parking target candidate H2 is superimposed as a green graphic image over the photographic image. When the parking target candidate H2 is ultimately decided as the parking target T, the vehicle 90 is parked in a path such as is shown by the dashed line in FIG. 10(a). The front wheels 53, which are the steered wheels, are steered in the direction corresponding to this dashed-line path. The rightward operated amount of the steering wheel 51 when the parking target candidate H2 is selected is preferably an operated amount that achieves the steering angle corresponding to a parking path such as is shown by the dashed line in FIG. 10(a). As shall be apparent, this operated amount also includes cases of rotating the steering wheel 51 one full rotation or more.

The deciding part 19 is a functioning part for deciding the selected (set) parking target T to be the target of parking assistance. A guiding part (not shown) of the ECU 9 receives the decision of the deciding part 19, calculates a parking path and a steering angle, and guides the vehicle 90. This guidance includes guidance by automatic steering, and guidance that instructs the driver's steering amount and steering direction using audio, characters, and graphics. The ultimate decision of the selected parking target candidate H as the parking target T is made by the operation of a confirm button (not shown) displayed on the touch panel 4b, or by a determination that the vehicle 90 has begin to travel by creeping due to the driver easing up on the brake pedal. These determinations made according to the behavior of the vehicle 90 are carried out based on the detection results of the brake sensor 27, the vehicle wheel speed sensor 23, and other sensors. The driver's selection of a parking target candidate H may be determined to be complete and the candidate may be decided as the parking target T by the driver easing or releasing their hold on the steering wheel 51. Such a determination made by the driver's behavior with respect to the steering wheel 51 may be carried out based on the detection results of the steering sensor 21, the torque sensor 22, or another sensor.

FIG. 11 shows an example of a case in which the steering wheel 51 is operated to the left direction (in the direction of the arrow L). Due to the steering wheel 51 being operated to the left direction, parking target candidates H detected to the left direction of the vehicle 90 can be selected. In FIGS. 9 and 11, two parking target candidates H are detected to the left direction of the vehicle 90, one parking target candidate H3 being relatively near the vehicle 90 and the other parking target candidate H1 being further away. The parking target candidate H1 further from the vehicle 90 is selected by the steering wheel 51 being operated to the left direction by at least first predetermined amount, which is a relatively small operated amount. The selected parking target candidate H1 is designated as the parking target T and is displayed superimposed as a graphic image in a different form from the other parking target candidates H2 and H3, e.g., as a green graphic image as shown by the solid lines in FIG. 11, similar to the description above. When the parking target candidate H1 is decided as the parking target, the vehicle 90 is parked in a path such as is shown by the dashed line in FIG. 11(a). The front wheels 53, which are the steered wheels, are steered in a direction corresponding to the path of this dashed line. Consequently, the leftward operated amount of the steering wheel 51 when the parking target candidate H1 is selected is preferably an operated amount that achieves the steering angle corresponding to a parking path such as is shown by the dashed line in FIG. 11(a).

FIG. 12, similar to FIG. 11, shows an example of a case in which the steering wheel 51 is operated to the left direction (in the direction of the arrow L). As described above, parking target candidates H detected to the left direction of the vehicle 90 become selectable due to the steering wheel 51 being operated to the left direction. Two parking target candidates H are detected to the left direction of the vehicle 90, one parking target candidate H3 being relatively near the vehicle 90 and the other parking target candidate H1 being farther away, as shown in FIGS. 9 and 12. The parking target candidate H3 nearer the vehicle 90 is selected by the steering wheel 51 being operated to the left direction by a relatively large operated amount, i.e., by at least a second predetermined amount that is greater than the first predetermined amount. The parking target candidate H3 is designated as the parking target T and is displayed superimposed as a graphic image in a different form from the other parking target candidates H1 and H2, e.g., as a green graphic image as shown by the solid lines in FIG. 12, similar to the description above. When the parking target candidate H3 is decided as the parking target, the vehicle 90 is parked in a path such as is shown by the dashed line in FIG. 12(a). The curvature in this path is larger than that of the parking path to the parking target candidate H1 which is farther from the vehicle 90. Consequently, the parking target candidate H3 nearer to the vehicle 90 is selected by an operated amount (the second predetermined amount) that is greater than the operated amount (the first predetermined amount) of the steering wheel 51 when the parking target candidate H1 farther from the vehicle 90 is selected. Specifically, the leftward operated amount of the steering wheel 51 when the parking target candidate H3 is selected is preferably an operated amount that achieves the steering angle corresponding to a parking path such as is shown by the dashed line in FIG. 12(a).

As described above, a plurality of parking target candidates H are detected, and one of these can be selected by the operation of the steering wheel 51. Particularly, in the present invention, a plurality of parking target candidates H can be detected to either the left or right of the vehicle 90, and one of these candidates can be selected by operating a driving device (e.g., the steering wheel 51). Because it is self-evident that a plurality of parking target candidates H cannot be detected if no spots for parking are open, the following is also a possibility. When a plurality of possible parking regions G are detected by the region detector 11, the display controller 17 superimposes a plurality of graphic images showing the parking target candidates H over positions to which the possible parking regions G correspond on the photographic image. The selection part 18 does not stop at selecting parking target candidates H to the left or right of the vehicle 90, but includes selecting from parking target candidates H set in a plurality of locations in the same direction to either the left or right of the vehicle 90, and selects one of the plurality of parking target candidates H as the parking target T on the basis of a command input from a driving device.

Figure 13:
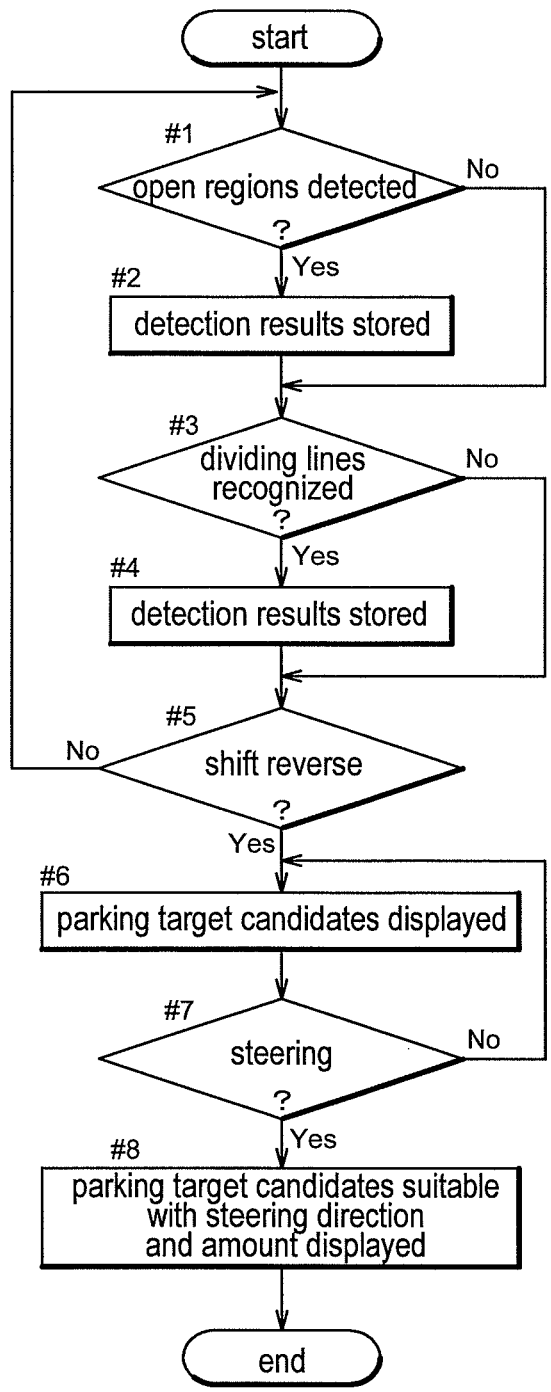
FIG. 13 is a flowchart showing an example of the process of selecting parking target candidates.

FIG. 13 is a flowchart schematically showing a series of processes from the detection of open regions E until the selection of parking target candidates H, and FIG. 13 is used hereinbelow to organize the series of processes of the parking assistance apparatus 10 of the present invention. Open regions E are detected as the vehicle 90 moves (#1), as described above based on FIGS. 3 through 6. Open regions E located within a predetermined range from the vehicle 90 are all compiled and stored in the compilation part 16 whose core is the working memory 7 or another component. In other words, the detection results are stored (#2). Next, regions of interest ROI are set as shown in FIG. 8 on the basis of the detected open regions E, dividing lines W are identified by image recognition, and possible parking regions G are detected as shown in FIG. 7 (#3). These detection results are also stored. Specifically, the possible parking regions G located within a predetermined range from the vehicle 90 are all compiled and stored in the compilation part 16 whose core is the working memory 7 or another component (#4). When no open regions E are detected, image recognition of the dividing lines W is executed on the entire photographic image, or on the regions of interest ROI set in predetermined regions relative to the vehicle 90 on the photographic image. When open regions E are detected and dividing lines W are not detected, such as in a parking lot that does not have dividing lines W, the possible parking regions G are set according to the open regions E.

In step #5, whether or not the shift lever 55 is in reverse is determined based on the detection results of the shift lever switch 25. Steps #1 to #4 are repeated until the shift lever 55 is set to reverse. Specifically, because the compilation part 16 is storing open regions E and possible parking regions G located within a predetermined range from the vehicle 90, new open regions E and possible parking regions G are detected sequentially according to the movement of the vehicle 90 when the vehicle is moving, and the stored data is updated. As the vehicle 90 then moves, the open regions E and possible parking regions G that cease to be located within a predetermined range from the vehicle 90 are deleted. When the shift lever 55 is determined to be in reverse in step #5, the possible parking regions G stored in the compilation part 16 are set as parking target candidates H. These candidates are then displayed as graphic images with the photographic image on the monitor device 4 (#6), as shown in FIG. 9. When the driver operates the steering wheel 51 at this time, parking target candidates H selected according to the steering direction and steered amount are displayed (#7, #8), as shown in FIGS. 10 through 12.

As described above, the present invention can provide a parking assistance apparatus whereby a driver can set a parking target position in a simple manner with a high degree of freedom without using input means not used in normal driving operation. The embodiment described above is one example, and the technological range of the present invention also encompasses modifications within a range that does not deviate from the scope of the present invention. Examples of such modifications are given hereinbelow.

[1] In the descriptions above, a steering wheel 51 which is a steering device was presented as an example of a driving device used in normal driving operation. However, the driving device is not limited to a steering device, and the steering device is not limited to the steering wheel 51. In welfare vehicles, stick handles are sometimes used as steering devices, and the parking target candidates H may be selected using such a stick handle. If the number of operations of a directional indicator can be counted, the parking target candidates H may be selected using the directional indicator as a driving device. For example, when the directional indicator is operated to the left direction and then operated again to the left direction a second time, two operations are counted and the second farthest parking target candidate H from the vehicle 90 is selected. Because the directional indicator remains operated to the left at this time, the fact that the vehicle is proceeding to the left direction is notified to the exterior of the vehicle 90. The same applies for the right direction.

[2] The above descriptions presented an example of a case in which the greater the operated amount of the steering wheel 51, the nearer to the vehicle 90 the selected parking target candidate H, but the selection process is of course not limited to this example. Other options include farther parking target candidates H being selected as the operated amount of the steering wheel 51 increases, and parking target candidates H being selected by the number of operations regardless of the operated amount of the steering wheel 51. The above descriptions presented an example of a case in which the operated amount of the steering wheel 51, when a parking target candidate H is selected, is an amount equivalent to the initial steering angle at the time the parking target candidate H is designated as the parking target T, but the operated amount is not limited to this example, as shall be apparent. The operated amount of the steering wheel 51, when the parking target candidate H is selected, may be unrelated to the steering angle during the guidance of parking assistance.

[3] In the example used in the above descriptions, when the region detector 11 detects possible parking regions G to both the left and right of the vehicle 90, the selection part 18 selects a parking target candidate H in the direction corresponding to the steered direction of the steering wheel 51 as the parking target T from among the parking target candidates H corresponding to the detected possible parking regions G (FIGS. 9 through 12, for example). However, even when possible parking regions G are not detected to either the left and right of the vehicle 90, in other words even when possible parking regions G are detected either only to the left or only to the right, a parking target candidate H located in the steered direction of the steering wheel 51 may be selected. Specifically, the selection part 18 may select a parking target candidate H located in the steered direction of the steering wheel 51 as the parking target T regardless of whether or not possible parking regions G are detected to both the left and right of the vehicle 90.

In this case, no parking target candidates H are selected as the parking target T when the vehicle is steered in a direction in which no possible parking regions G are detected, and any parking target candidate H is selected as the parking target T when the vehicle is steered in a direction in which possible parking regions G are detected. A parking target T can thereby be selected by steering in the same direction as what was steered for turning the vehicle 90, even when possible parking regions G are detected only to the left or only to the right.

Even when the steering wheel 51 which is a steering device is used as a driving device used in normal driving operation, the steered direction and the direction of the selected parking target candidate H need not coincide. For example, when possible parking regions G are detected either only to the left or only to the right, this does not impede a configuration such that the parking target T is selected not only by the steered direction but also by the steered amount and other parameters, for example.

DESCRIPTION OF REFERENCE NUMERALS/MARKS

4: Monitor device
11: Region detector

15: Photographic image acquisition part
17: Display controller
18: Selection part
51: Steering wheel (driving device, steering device)
90: Vehicle
G: Possible parking region
H: Parking target candidate
T: Parking target

The invention claimed is:

1. A parking assistance apparatus comprising:
a region detector capable of detecting a plurality of possible parking regions in which a vehicle can park in at least one side to the left or right of the vehicle;
photographic image acquisition part for acquiring a photographic image of the scene surrounding the vehicle;
a display controller for displaying the photographic image on a monitor device and superimposing graphic images showing parking target candidates in positions where the possible parking regions detected by the region detector correspond on the photographic image; and
a selection part capable of selecting one of the parking target candidates as a parking target on the basis of command input from a driving device of the vehicle, wherein
the driving device is a steering device of the vehicle, and
the selection part selects as the parking target a parking target candidate in a position that is nearer to the vehicle when, based on an operated amount of the steering device, the operated amount is greater.

2. The parking assistance apparatus according to claim 1, wherein the selection part is capable of selecting one of a plurality of the parking target candidates as the parking target in at least one side to the left or right of the vehicle.

3. The parking assistance apparatus according to claim 1, wherein the selection part selects, as the parking target, the parking target candidate located in the steering direction of the steering device.

4. The parking assistance apparatus according to claim 3, wherein a photographic image displayed in the monitor device is a photographed image of the rear of the vehicle reflected left-to-right as in a mirror, and one of the parking target candidates superimposed on the photographic image is selected as the parking target.

5. The parking assistance apparatus according to claim 1, wherein the selection part, when the region detector has detected the possible parking regions to both the left and right of the vehicle, selects as the parking target the parking target candidate in the direction corresponding to the steering direction of the steering device from among the parking target candidates corresponding to the detected possible parking regions.

6. The parking assistance apparatus according to claim 1, wherein the operated amount of the steering device when the parking target is selected is treated as an initial steering angle during guidance along a parking route to the parking target.

* * * * *